United States Patent
Kobayashi

(10) Patent No.: US 12,519,336 B2
(45) Date of Patent: Jan. 6, 2026

(54) POWER STORAGE DEVICE CONTROL APPARATUS, POWER STORAGE DEVICE CONTROL SYSTEM, AND POWER STORAGE DEVICE CONTROL METHOD

(71) Applicant: HONDA MOTOR CO., LTD., Tokyo (JP)

(72) Inventor: Tetsuhiro Kobayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 784 days.

(21) Appl. No.: 17/807,735

(22) Filed: Jun. 20, 2022

(65) Prior Publication Data

US 2022/0407339 A1    Dec. 22, 2022

(30) Foreign Application Priority Data

Jun. 22, 2021  (JP) ................... 2021-103436

(51) Int. Cl.
*H02J 7/00* (2006.01)

(52) U.S. Cl.
CPC ...... *H02J 7/007182* (2020.01); *H02J 7/0063* (2013.01); *H02J 7/0069* (2020.01)

(58) Field of Classification Search
None
See application file for complete search history.

(56) References Cited

U.S. PATENT DOCUMENTS

| | | | |
|---|---|---|---|
| 2004/0070353 A1* | 4/2004 | Kayukawa | B60L 58/24 318/139 |
| 2009/0309575 A1* | 12/2009 | Suzuki | G01R 19/16528 324/140 R |
| 2010/0204861 A1* | 8/2010 | Kaita | H02J 7/007188 320/133 |
| 2012/0086368 A1 | 4/2012 | Kawabuchi et al. | |

(Continued)

FOREIGN PATENT DOCUMENTS

| | | |
|---|---|---|
| CN | 102447140 A | 5/2012 |
| CN | 104115017 A | 10/2014 |

(Continued)

OTHER PUBLICATIONS

Notification of Reasons for Refusal issued Nov. 12, 2024 in the JP Patent Application No. 2021-103436.

(Continued)

*Primary Examiner* — Arun C Williams
(74) *Attorney, Agent, or Firm* — CKC & Partners Co., LLC

(57) ABSTRACT

To provide a power storage device control apparatus, a power storage device control system, and a power storage device control method that can increase the available power storage capacity (battery capacity) of a deteriorated power storage device such as a secondary battery without causing further deterioration of the power storage device. A battery control apparatus of an embodiment includes a controller. The controller lowers a lower limit voltage of discharge of a power storage device to a value in a range where a positive (Continued)

electrode potential of the power storage device is more than a first threshold or to a value in a range where a negative electrode potential of the power storage device is less than a second threshold, based on a deterioration state of the power storage device.

4 Claims, 4 Drawing Sheets

(56) References Cited

U.S. PATENT DOCUMENTS

| | | |
|---|---|---|
| 2015/0153424 A1 | 6/2015 | Kanada |
| 2018/0261893 A1 | 9/2018 | Fujita et al. |
| 2021/0001747 A1 | 1/2021 | Shimura |

FOREIGN PATENT DOCUMENTS

| | | |
|---|---|---|
| CN | 108574317 A | 9/2018 |
| JP | 2000270491 A | 9/2000 |
| JP | 2011215083 A | 10/2011 |
| JP | 2012049017 A | 3/2012 |
| JP | 2015110922 A | 6/2015 |
| JP | 2016170885 A | 9/2016 |
| JP | 2016197955 A | 11/2016 |
| JP | 2020107774 A | 7/2020 |
| WO | 2013133017 A1 | 9/2013 |
| WO | 2019181764 A1 | 9/2019 |

OTHER PUBLICATIONS

Office Action issued in the CN Patent Application No. 202210690795.8, mailed on May 8, 2024.

\* cited by examiner

POWER STORAGE DEVICE CONTROL APPARATUS, POWER STORAGE DEVICE CONTROL SYSTEM, AND POWER STORAGE DEVICE CONTROL METHOD

This application is based on and claims the benefit, of priority from Japanese Patent. Application No. 2021-103436, filed on 22 Jun. 2021, the content of which is incorporated herein by reference.

BACKGROUND OF THE INVENTION

Field of the Invention

The present invention relates to a power storage device control apparatus, a power storage device control system, and a power storage device control method.

Related Art

In a lithium-ion secondary battery, a lower limit voltage and an upper limit voltage are set so that the battery is used in an appropriate voltage range. A lithium-ion secondary battery control apparatus controls the terminal voltage of a lithium-ion secondary battery so as to be within the range from the lower limit voltage to the upper limit voltage. The control apparatus controls the lithium-ion secondary battery to be used in the appropriate voltage range to prevent overcharging of the lithium-ion secondary battery and suppress deterioration.

Lithium-ion secondary batteries have an issue that, the battery capacity decreases due to deterioration, Patent Document 1: Japanese Unexamined Patent Application, Publication No. 2015-110922

SUMMARY OF THE INVENTION

In response to the above issue, it is an object of the present invention to provide a power storage device control apparatus, a power storage device control system, and a power storage device control method that can increase the available power storage capacity (battery capacity) of a deteriorated power storage device such as a secondary battery without, causing further deterioration of the power storage device.

A power storage device control apparatus of an embodiment includes a controller. The controller lowers a lower limit voltage of discharge of a power storage device to a value in a range where a positive electrode potential of the power storage device is more than a first threshold or to a value in a range where a negative electrode potential of the power storage device is less than a second threshold, based on a deterioration state of the power storage device.

The present invention can increase the available power storage capacity of a deteriorated power storage device without causing further deterioration of the power storage device.

DETAILED DESCRIPTION OF THE INVENTION

Figure 1:
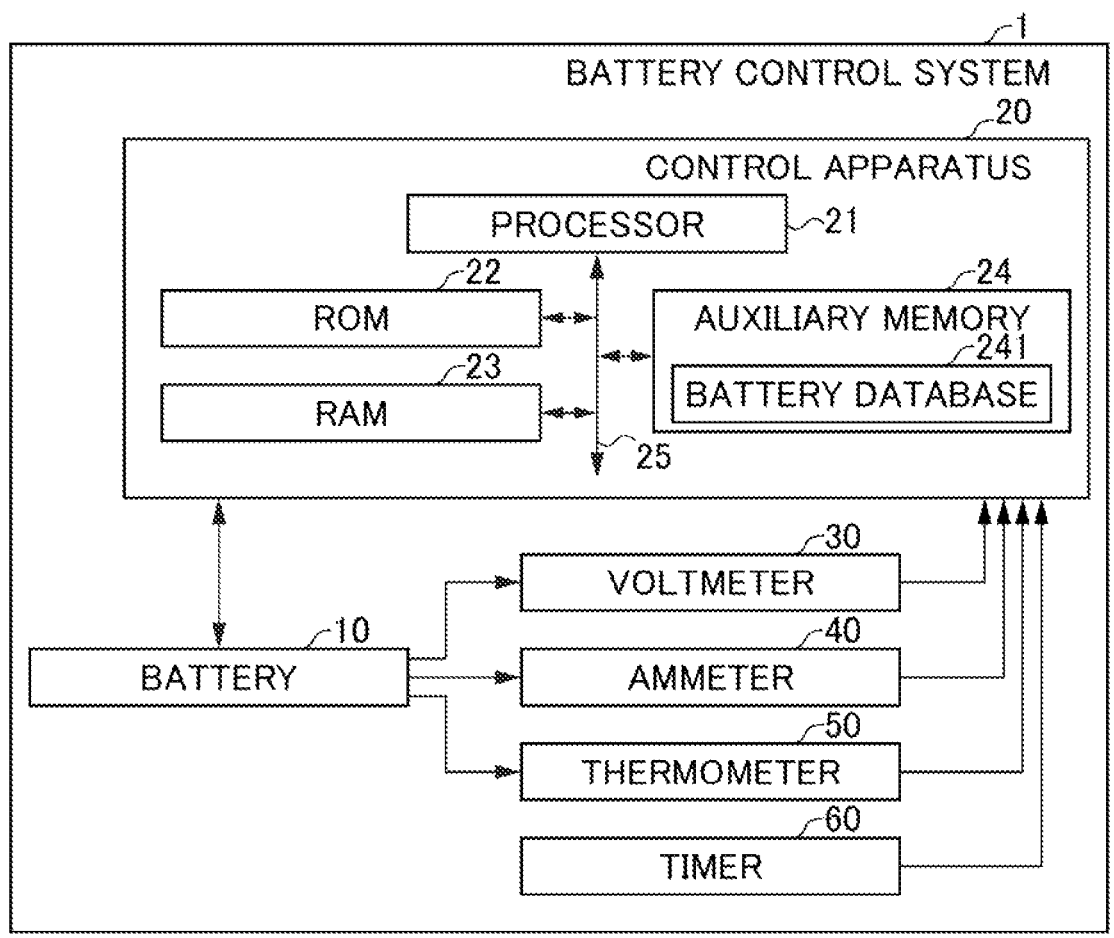
FIG. 1 is a block diagram showing an example of the main components of a battery control system according to an embodiment.

A battery control system according to an embodiment will now be described with reference to the drawings. Each of the drawings used in the following description of the embodiment may show the structure in an abbreviated form for the sake of the description. In the drawings and the present specification, the same reference numeral indicates the same component. FIG. 1 is a block diagram showing an example of the main components of a battery control system 1 according to the embodiment.

The battery control system 1 is a system that controls a battery 10. The battery control system 1 includes, as an example, the battery 10, a control apparatus 20, a voltmeter 30, an ammeter 40, a thermometer 50, and a timer 60. The battery control system 1 is an example of a power storage device control system.

The battery 10 is, for example, a lithium-ion secondary battery. Therefore, the battery 10 can be charged and discharged. The positive electrode material of the battery 10 is, as an example, a ternary material. The battery 10 is an example of a power storage device.

The control apparatus 20 is a computer that performs calculations, control, and other processing necessary for the operation of the battery control system 1. The control apparatus 20 includes, as an example, a processor 21, a read-only memory (ROM) 22, a random-access memory (RAM) 23, and an auxiliary memory 24. A bus 25 or the like connects each of these components. The control apparatus 20 is an example of a power storage device control apparatus.

The processor 21 is the central part of the control apparatus 20, and performs various calculations, processing, and the like. Examples of the processor 21 include a central processing unit (CPU), micro processing unit (MPU), system on system on a chip (SoC), digital signal processor (DSP), application specific integrated circuit (ASIC), programmable logic device (PLD), and field-programmable gate array (FPGA). Alternatively, the processor 21 is a combination of these. Alternatively, the processor 21 may be a combination of these and a hardware accelerator. The processor 21 controls the components based on programs such as firmware, system software, and application software stored in the ROM 22, auxiliary memory 24, and the like to realise various functions of the battery control system 1. In addition, the processor 21 executes the processing described below based on these programs. Some or all of the programs may be embedded in the circuitry of the processor 21. The processor 21 is an example of a controller.

The ROM 22 and RAM 23 are the main memories of the control apparatus 20. The ROM 22 is a non-volatile memory used exclusively for reading data. The ROM 22 stores, for example, firmware among the above programs. The ROM 22 also stores data and other information used by the processor 21 in performing various processes. The RAM 23 is a memory used for reading and writing data. The RAM 23 is used as a work area or the like for storing data that is temporarily used by the processor 21 in performing various processes. The RAM 23 is typically a volatile memory.

The auxiliary memory 24 is the auxiliary memory of the control apparatus 20. Examples of the auxiliary memory 24 include electric erasable programmable read-only memory (EEPROM), hard disk drive (HDD), and flash memory. The auxiliary memory 24 stores, for example, system software and application software among the above programs. The auxiliary memory 24 stores data used by the processor 21 in performing various processes, data generated by the processing performed by the processor 21, various setting values, and so on.

The auxiliary memory 24 also stores a battery database 241. The battery database 241 is a database that stores and manages various data related to the battery 10. The various data include data used to determine the deterioration state of the battery 10.

The bus 25 includes a control bus, an address bus, and a data bus, and transmits signals transmitted and received by each component of the control apparatus 20.

The voltmeter 30 measures the terminal voltage (cell voltage, battery voltage) of the battery 10. The voltmeter 30, for example, outputs a signal indicating the value of the measured voltage.

The ammeter 40 measures the charge and discharge currents of the battery 10. The charge and discharge currents include a charge current and a discharge current. The ammeter 40, for example, outputs a signal indicating the value of the measured current.

The thermometer 50 measures the temperature of the battery 10. The thermometer 50, for example, outputs a signal indicating the value of the measured temperature.

The timer 60 measures time. The timer 60, for example, outputs a signal indicating the measured time.

The processor 21 obtains the terminal voltage, charge and discharge currents, temperature, and time of the battery 10 by receiving, as input, signals output by the voltmeter 30, ammeter 40, thermometer 50, and timer 60. The processor 21 uses the timer 60 to measure the charging and discharging times of the battery 10. The charging and discharging times include charging time and discharging time. The charging time is, for example, the total length of time during which the battery 10 is being charged. The discharging time is, for example, the total length of time during which the battery 10 is being discharged.

Figure 2:
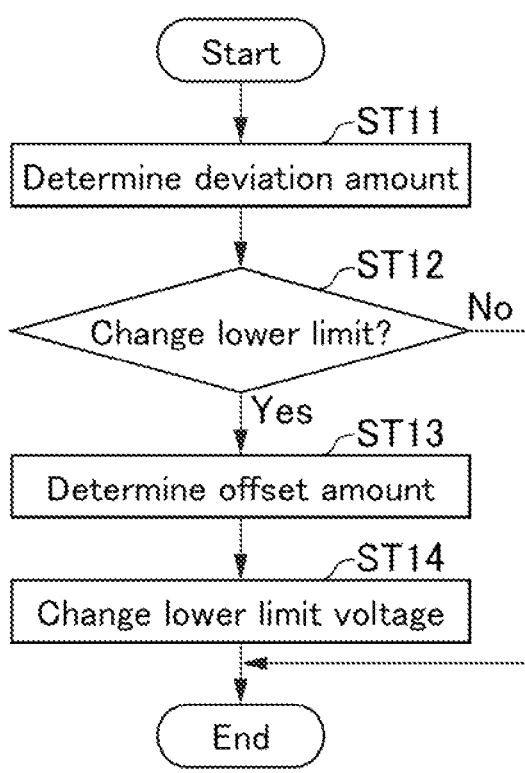
FIG. 2 is a flowchart showing an example of the processing performed by a processor in FIG. 1.

The operation of the battery control system 1 according to the embodiment is described below with reference to FIG. 2. The content of the process in the following description of the operation is an example, and various processes capable of obtaining similar results can be used as appropriate. FIG. 2 is a flowchart showing an example of the processing performed by the processor 21 of the control apparatus 20. The processor 21 executes the process shown in FIG. 2, for example, based on a program stored in the ROM 22 or auxiliary memory 24.

The processor 21 starts the process shown in FIG. 2, for example, every predetermined time. The processor 21 starts the process shown in FIG. 2, for example, when the processor 21 receives an input instructing the processor 21 to execute the process shown in FIG. 2. The processor 21 starts the process shown in FIG. 2, for example, when a predetermined condition based on at least one of the following: the number of times the battery 10 is charged, the number of times the battery 10 is discharged, the charging time, and the discharging time, is satisfied. The processor 21 starts the process shown in FIG. 2, for example, when the charging of the battery 10 is started.

In step ST11, the processor 21 determines a deviation amount G1 by calculation or other means. The processor 21 determines the deviation amount G1, for example, by using a deterioration state. The processor 21 determines the deterioration state of the battery 10 by calculation or other means. The processor 21 determines the deterioration state of the battery 10, for example, by using the following method (A) or (B). Alternatively, the processor 21 determines the deterioration state of the battery 10 by using a combination of the methods (A) and (B).

(A)

The processor 21 determines, for example, a state of health (SOH) as a value that indicates the deterioration state of the battery 10. SOH can be determined, for example, by the following equation (1):

$$SOH = (\text{current battery capacity})/(\text{battery capacity at beginning of life(BOL)}) \times 100 (\%) \quad (1)$$

A smaller SOH value indicates a more deteriorated battery 10. In other words, the smaller the value of SOH, the greater the degree of deterioration of the battery 10.

"Beginning of life (BOL)" refers to, for example, a state at a certain point in time during or after the manufacture of the battery 10. "A certain point in time" refers to, for example, the time of inspection during manufacturing, the time of completion of manufacturing, the time of inspection after manufacturing, or the time of shipping from the factory. The battery capacity at SOL may be a predetermined value rather than a value measured individually for each battery 10. "A predetermined value" refers to, for example, the battery capacity at BOL measured using a battery with the same specifications as the battery 10.

The lower limit voltage of the battery 10 changes in the present embodiment. Therefore, the current battery capacity in the equation of SOH is preferably the battery capacity when the upper limit voltage and lower limit voltage are the same as those at SQL. Here, the lower limit voltage and upper limit voltage indicate the lower limit and upper limit of the terminal voltage of the battery 10. The processor 21 stops discharging of the battery 10 when the terminal voltage of the battery 10 becomes the lower limit voltage or less. The processor 21 determines that the terminal voltage is the lower limit voltage or less, for example, when the terminal voltage becomes equal to or less than the lower limit voltage, the voltage obtained by adding a predetermined value VA1 to the lower limit voltage, or the voltage obtained by multiplying the lower limit voltage by a predetermined value VA2. The processor 21 stops charging of the battery 10 when the terminal voltage of the battery 10 becomes equal to or higher than the upper limit voltage. The processor 21 determines that the terminal voltage is the upper limit voltage or more, for example, when the terminal voltage becomes equal to or more than the upper limit voltage, the voltage obtained by subtracting a predetermined value VA3 from the upper limit voltage, or the voltage obtained by multiplying the upper limit voltage by a predetermined value VA4. The values VAX through VA4 are positive numbers. The value VA2 is a value more than 1. The value VA4 is a value less than 1.

Figure 3:
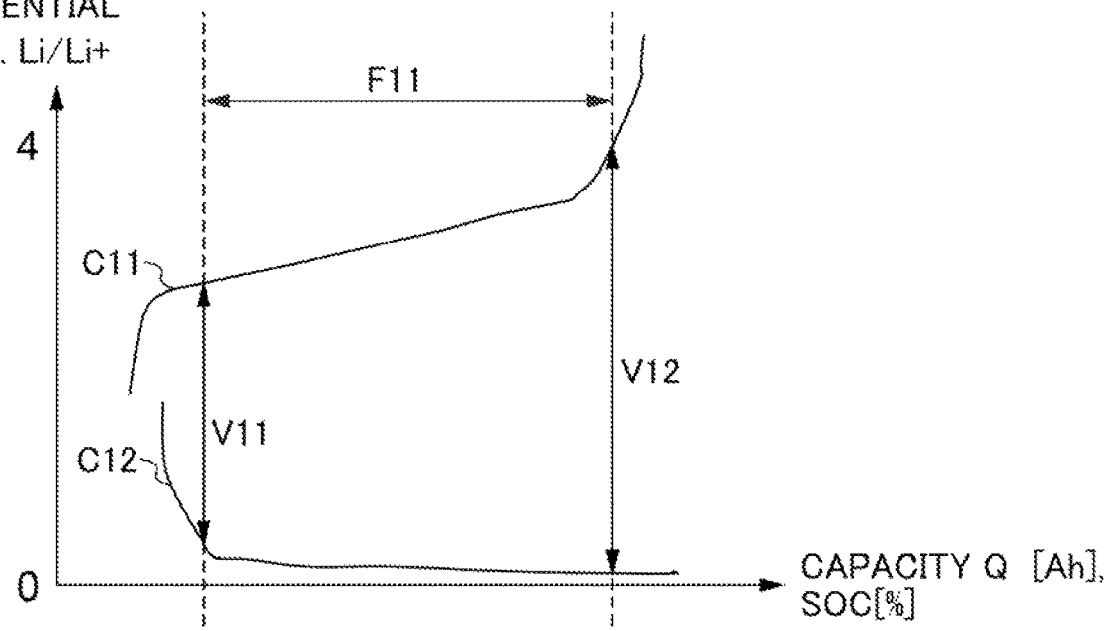
FIG. 3 illustrates graphs showing capacity characteristics of the positive electrode potential and negative electrode potential at beginning of life (BOL) and end of life (EOL)
Figure 3:
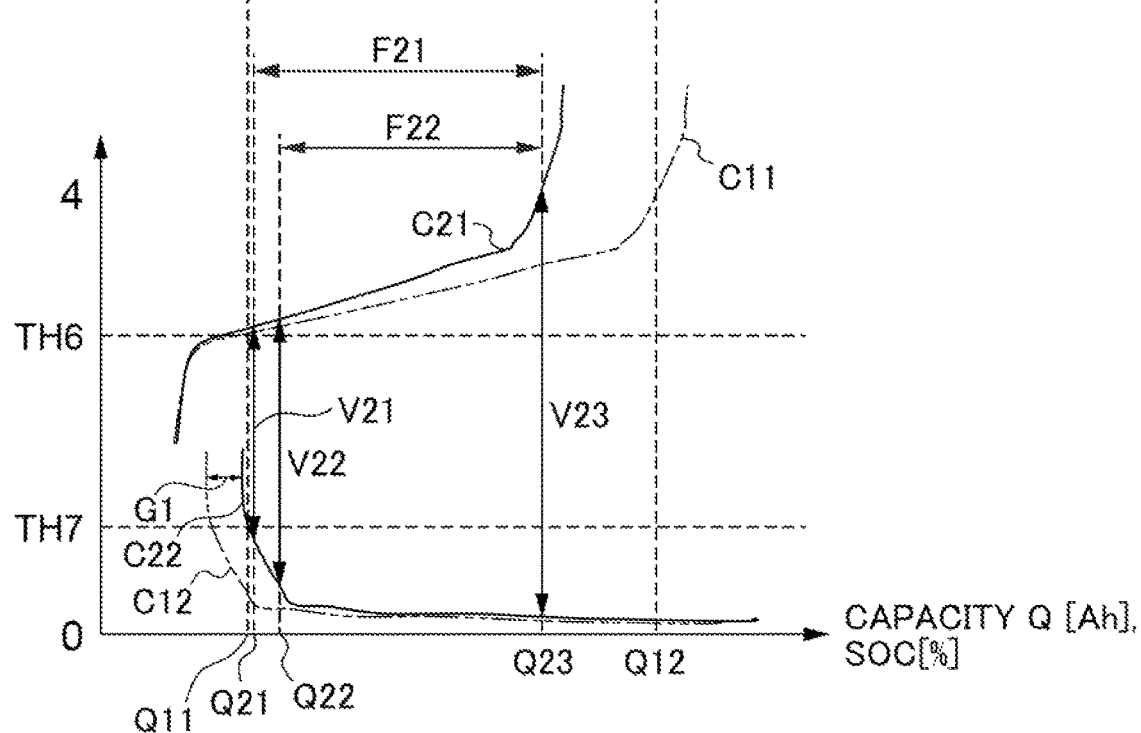

FIG. 3 shows the positive electrode potential and negative electrode potential at BOL and the positive electrode potential and negative electrode potential at a deteriorated state. FIG. 3 illustrates graphs showing capacity characteristics of the positive electrode potential and negative electrode potential at BOL and end of life (EOL). It should be noted that FIG. 3 shows an example, and the measurement results of the present embodiment may differ from those shown in FIG. 3. Curve C11 is an example of the capacity-potential curve of the positive electrode at BOL. Curve C12 is an example of the capacity-potential curve of the negative electrode at BOL, The unit of potential in FIG. 3 is, for example, volts (V vs. Li/Li+). The unit of capacity in FIG. 3 is, for example, ampere-hours (Ah) or %. As shown in FIG. 3, as the capacity Q increases, the positive electrode potential increases and the negative electrode potential decreases. As the capacity Q decreases, the positive electrode potential decreases and the negative electrode potential increases.

The potential difference V11 indicates the lower limit voltage at BOL. The potential difference V12 indicates the upper limit voltage at BOL. The potential differences V11 and 712 are the positive electrode potentials with respect to the negative electrode potentials. The capacity Q11 indicates the capacity of the battery 10 at the lower limit voltage V11 at BOL. At BOL, the capacity Q11 is 0% when expressed in state of charge (SOC). In other words, the capacity Q11 is the capacity in the fully discharged state at BOL. The capacity Q12 indicates the capacity of the battery 10 at the upper limit voltage V12 at BOL. At BOL, the capacity Q12 is 100% when expressed in SOC. In other words, the capacity Q12 is the fully charged capacity at BOL. From the above, the battery capacity F11 indicates the battery capacity of the battery 10 at BOL. F11 is equal to Q12 minus Q11 (F11=Q12−Q11).

When the battery 10 deteriorates, the positive electrode potential and negative electrode potential respectively become as shown in curves C21 and C22 as an example. For comparison, curves C11 and C12 are also shown by long dashed double-short dashed lines in the same graph as curves C21 and C22. Curve C21 Is the capacity-potential curve of the positive electrode at EOL, where the battery 10 deteriorated. Curve C22 is the capacity-potential curve of the negative electrode at EOL. As shown in the graph, curve C21 looks to have a shape comparable to a reduction of curve C11 in the horizontal axis direction due to the deterioration of the positive electrode active material of the battery 10. This amount of reduction becomes larger as the battery 10 deteriorates. Curve C22 is a parallel shift of curve C12 in the positive horizontal axis direction due to the charge-discharge imbalance of the battery 10. The amount of the parallel shift (deviation amount G1) becomes larger as the battery 10 deteriorates. Thus, the battery capacity of the battery 10 at EOL becomes the battery capacity F22 when the upper limit voltage and the lower limit voltage are the same as those at BOL. The potential difference V22 indicates the lower limit voltage at EOL when the lower limit voltage at EOL is the same as that at BOL. Therefore, the value of the potential difference V22 is equal to the value of the potential difference V11. The potential difference V23 indicates the upper limit voltage at EOL when the upper limit voltage at EOL is the same as that at BOL. Therefore, the value of the potential difference V23 is equal to the value of the potential difference V12. The capacity Q22 indicates the capacity of the battery 10 at the lower limit voltage V22 at EOL when the lower limit voltage at EOL is equal to that at BOL. At EOL, the capacity Q22 is 0% when expressed in SOC. In other words, the capacity Q22 is the capacity in the fully discharged state at EOL when the lower limit voltage at EOL is equal to that at BOL. The capacity Q23 is the capacity of the battery 10 at the upper limit voltage V23 at EOL when the upper limit voltage at EOL is equal to that at BOL. At EOL, the capacity Q23 is 100% when expressed in SOC. In other words, the capacity Q23 is the fully charged capacity at EOL when the upper limit voltage at EOL is equal to that at BOL. F22 is equal to Q23 minus 022 (F22=Q23−Q22). The deviation amount G1 is an example of the deviation amount with respect to the capacity of the battery 10.

As shown above, the battery capacity of the battery 10 decreases as the battery 10 deteriorates. The SOH at EOL can be expressed by the following equation:

$$SOH = F22/F11 \times 100(\%) \quad (2)$$

The processor 21 uses dV/dQ to determine the deterioration state of the battery 10. Here, dV/dQ is the value obtained by differentiating the capacity Q of the battery 10 with respect to the terminal voltage V of the battery 10. In other words, dV/dQ is the ratio of the amount of change in the terminal voltage V to the amount of change in the capacity Q.

The processor 21 measures a capacity Q, for example, by using the charge/discharge current I and charge/discharge time of the battery 10, The processor 21 calculates a capacity Q, for example, by obtaining a measured value of the charge/discharge current I every predetermined time, and integrating the charge/discharge current I over time. The processor 21 determines dV/dQ by using a measured value of the terminal voltage V of the battery 10 obtained every predetermined time and the calculated capacity Q.

The processor 21 determines SOH, for example, from dV/dQ. As the method of determining SOH from dV/dQ, known methods can be used. The processor 21 determines a SOH from dV/dQ, for example, by using a table or map included in the battery database 241.

The processor 22 may determine the deterioration state of the battery 10 by using dQ/dV instead of dV/dQ. dQ/dV is the value obtained by differentiating the terminal voltage V with respect to the capacity Q.

(B)

The processor 21 determines values that indicate the deterioration state of the battery 10, such as a positive electrode deterioration amount K1, a negative electrode deterioration amount K2, and a lithium trap amount TK1. The larger the positive electrode deterioration amount K1, the negative electrode deterioration amount K2, and the lithium trap amount TK1, the more deteriorated the battery 10. In other words, the larger the positive electrode deterioration amount K1, the negative electrode deterioration amount K2, and the lithium trap amount TK1, the worse the deterioration state of the battery 10.

The positive electrode deterioration amount K1 is a value that indicates the degree of deterioration of the positive electrode of the battery 10. The positive electrode of the battery 10 deteriorates over time, as a result of charging and discharging, and the like. As the positive electrode of the battery 10 deteriorates, the amount of lithium ions that can be released or occluded by the positive electrode active material decreases.

The negative electrode deterioration amount K2 is a value that indicates the degree of deterioration of the negative electrode of the battery 10. The negative electrode of the battery 10 deteriorates over time, as a result of charging and discharging, and the like. As the negative electrode of the battery 10 deteriorates, the amount of lithium ions that can be released or occluded by the negative electrode active material decreases.

The lithium trap amount TK1 is a value that indicates a decrease amount of lithium that contributes to the battery reaction. In the battery 10, lithium ions are released from the positive electrode and the negative electrode occludes the lithium ions during charging. As a result, the negative electrode stores electric charge. In the battery 10, the lithium ions stored in the negative electrode are released and the lithium ions return to the positive electrode. In this way, lithium ions move between the positive electrode and negative electrode by charging and discharging. However, lithium ions are partially incorporated into the film and precipitate with over time, as a result of charging and discharging, and the like. The lithium ions that are incorporated into the film or precipitate no longer contribute to the battery reaction.

The processor 21 determines the positive electrode deterioration amount K1, negative electrode deterioration amount K2, and lithium trap amount TK1, for example, by using the state of the battery 10 and time. The state of the battery 10 includes, for example, the temperature, state of charge (SOC), and conduction state. Examples of the conduction state of the battery 10 include three types of states: a charging state, a discharging state, and a non-conduction state. Alternatively, the conduction state of the battery 10 may be two types of states: a charging/discharging state and a non-conduct ion state.

The battery database 241 includes data (deterioration amount data) that indicates how much the positive electrode deterioration amount K1, negative electrode deterioration amount K2, and lithium trap amount TK1 increase when the battery 10 is kept in a certain state for a unit time. The deterioration amount data is, for example, in the form of a table or map. Alternatively, the deterioration amount data may be in the form of a function such as a mathematical formula.

As an example, the deterioration amount data in the form of a table includes information on how much the positive electrode deterioration amount K1 increases per unit time when the conduction state is a charging state, the temperature is 20° C., and the SOC is 40%. Thus, the deterioration amount data in the form of a table stores the increase amount per unit time of the positive electrode deterioration amount K1, negative electrode deterioration amount K2, and lithium trap amount TK1 in association with various temperatures and various SOCs for each conduction state.

The deterioration amount data in the form of a function shows, as an example, the increase amount of the positive electrode deterioration amount K1, negative electrode deterioration amount K2, and lithium, trap amount TK 1, as a function of the state battery 10 and time.

The processor 21 obtains the current state of the battery 10 every predetermined time, determines the increase amount of each of the positive electrode deterioration amount K1, negative electrode deterioration amount K2, and lithium trap amount TK1 using the deterioration amount data based on the state of the battery 10 and the time during the state of the battery 10 continues, and sums the increase amounts to determine each of the positive electrode deterioration amount K1, negative electrode deterioration amount K2, and lithium trap amount TK1.

The processor 21 determines the positive electrode deterioration amount K1, negative electrode deterioration amount K2, and lithium trap amount TK1 every predetermined time to update the positive electrode deterioration amount K1, negative electrode deterioration amount K2, and lithium trap amount TK1 in real time. Alternatively, the processor 21 stores the history of temperature changes, SOC changes, and conduction state changes of the battery 10 in the battery database 241 of: the auxiliary memory 24, RAM 23, or the like and determines the positive electrode deterioration amount K negative electrode deterioration amount K2, and lithium trap amount TK1 as necessary.

The processor 21 may use the capacity Q instead of SOC determine the positive electrode deterioration amount K1, negative electrode deterioration amount K2, and lithium trap amount TK1. Alternatively, the processor 21 may use other known methods to determine the positive electrode deterioration amount K1, negative electrode deterioration amount K2, and lithium trap amount TK1.

The processor 21 uses SOH to determine the deviation amount G1, The processor 21 uses the SOH determined in (A) to determine the deviation amount G1, for example. The processor 21 uses a table, function, or the like that shows the relationship between SOH and the deviation amount G1 to determine the deviation amount G1. The battery database 241 includes said table, function, or the like. Said table associates a deviation amount G1 with each value of SOH and stores the deviation amount G1 for each value of SOH, for example. Said function is, for example, a function of SOH that indicates the value of the deviation amount G1.

Alternatively, the processor 21 determines the deviation amount G1, for example, by using at least one of the positive electrode deterioration amount. K1, negative electrode deterioration amount K2, and lithium trap amount TK1 determined in (B). Alternatively, the processor 21 determines the deviation amount G1 by using a table, function, or the like that shows the relationship between at least one of the positive electrode deterioration amount K1, negative electrode deterioration amount K2, and lithium trap amount TK1, and the deviation amount G1. The battery database 241 includes said table, function, or the like. Said table associates a deviation amount G1 with each value of at least one of the positive electrode deterioration amount K1, negative electrode deterioration amount K2, and lithium trap amount TK1 to store the deviation amount G1 for each value of at least one of the positive electrode deterioration amount K1, negative electrode deterioration amount K2, and lithium trap amount TK1, for example. As an example, said table associates a deviation amount G1 with each value of the negative electrode deterioration amount K2 to store the deviation amount G1 for each value of the negative electrode deterioration amount K2. Said function is, for example, a function of at least one of the positive electrode deterioration amount K1, negative electrode deterioration amount K2, and lithium trap amount TK1, which indicates the value of the deviation amount G1. Said function is, as an example, a function of the negative electrode deterioration amount K2, which indicates the value of the deviation amount G1. The deviation amount G1 is considered, to increase as the negative electrode deterioration amount K2 increases.

The processor 21 may determine the deviation amount G1 from dV/dQ or dQ/dV without determining SOH in (A). The processor 21 can indirectly estimate the deviation amount G1, for example, by utilizing the fact that the peak of a plot of dV/dQ indicates the redox reaction of the battery to calculate the peak shift due to deterioration. The processor 21 may determine the deviation amount G1 by other known methods.

In step ST12, the processor 21 determines whether to change the lower limit voltage of the battery 10. The processor 21 determines whether to change the lower limit voltage of the battery 10, for example, by using the deviation amount G1 determined in step ST11. The processor 21 determines to change the lower limit voltage of the battery 10, for example, when the number of times the lower limit voltage has been changed is 0 and the deviation amount G1 is a threshold TH1 or less. The processor 21 determines whether to change the lower limit voltage of the battery 10, for example, by using the SOH determined in (A). The processor 21 determines to change the lower limit voltage of the battery 10, for example, when the number of times the lower limit voltage has been changed is 0 and the SOH is a threshold TH2 or less. The processor 21 determines whether to change the lower limit voltage of the battery 10, for example, by using at least one of the positive electrode deterioration amount K1, negative electrode deterioration amount K2, and lithium trap amount TK1 determined in (B). The processor 21 determines to change the lower limit voltage of the battery 10, for example, when the number of times the lower limit voltage has been changed is 0 and any one of the three conditions "the positive electrode deterioration amount K1 is a threshold TH3 or more", "the negative electrode deterioration amount K2 is a threshold TH4 or more", and "the lithium trap amount TK1 is a threshold TH5 or more" is satisfied. Alternatively, the processor 21 determines to change the lower limit voltage of the battery 10, for example, when the number of times the lower limit voltage has been changed is 0 and all the above three conditions are satisfied. The thresholds TH1 to TH5 are predetermined, for example, by the designer or administrator of the battery control system 1. Alternatively, the processor 21 may determine that the lower limit voltage of the battery 10 is to be changed, for example, when the number of times the lower limit voltage has been changed is 1 or more and the deviation amount G1 or the deterioration state of the battery 10 has deteriorated beyond a predetermined level since the last time the lower limit voltage was changed. If the processor 21 does not determine to change the lower limit voltage of the battery 10, then it determines No in step ST12 and ends the process shown in FIG. 2. In contrast, if the processor 21 determines to change the lower limit voltage of the battery 10, it determines Yes in step ST12 and proceeds to step ST13.

In step ST13, the processor 21 determines an offset amount, from the deviation amount G1 determined in step ST11. The offset amount indicates how many volts the lower limit voltage is lowered. The processor 21 determines an offset amount so as to satisfy at least one of the following conditions in the current deterioration state of the battery 10, when the terminal voltage of the battery 10 is at the lower limit voltage: the positive electrode potential is not within the positive electrode deterioration range; and the negative electrode potential is not within the negative electrode deterioration range. Preferably, the processor 21 determines an offset amount such that the positive electrode potential is not within the positive electrode deterioration range and the negative electrode potential is not within the negative electrode deterioration range when the terminal voltage of the battery 10 is at the lower limit voltage. The positive electrode deterioration range indicates the range of the positive electrode potential of the battery 10 where the positive electrode deteriorates particularly quickly. The positive electrode deterioration range is, for example, the range where the positive electrode potential [V vs. Li/Li+] is a threshold TH6 or less. The negative electrode deterioration range indicates the range of the negative electrode potential of the battery 10 where the negative electrode deteriorates particularly quickly. The negative electrode deterioration range is, for example, the range where the negative electrode potential [V vs. Li/Li+] is a threshold TH7 or more. The processor 21 determines an offset amount, for example, by using the deviation amount G1 and a table or function included in the battery database 241. Said table associates an offset amount with each value of the deviation amount G1 to store the offset amount for each value of the deviation amount G1, for example. The offset value in said table is, for example, a value such that the positive electrode potential of the battery 10 is not within the positive electrode deterioration range or the negative electrode potential of the battery 10 is not within the negative electrode deterioration range. Preferably, the offset value in said table is, for example, a value such that the positive electrode potential of the battery 10 is not within the positive electrode deterioration range and the negative electrode potential of the battery 10 is not within the negative electrode deterioration range. Said function is, for example, a function of the deviation amount G1, which indicates the offset amount. The offset value determined by said function is a value such that the negative electrode potential of the battery 10 is not within the negative electrode deterioration range or the positive electrode potential of the battery 10 is not within the positive electrode deterioration range. Preferably, the offset value determined by said function is a value such that the positive electrode potential of the battery 10 is not within the positive electrode deterioration range and the negative electrode potential of the battery 10 is not within the negative electrode deterioration range. The offset amount is, for example, a value such that, when the lower limit voltage is lowered by the offset amount at BOL, the positive electrode potential of the battery 10 is within the positive electrode deterioration range or the negative electrode potential of the battery 10 is within the negative electrode deterioration range. The offset amount is, for example, a value such that, when the lower limit voltage is lowered by the offset amount at BOL, the positive electrode potential of the battery 10 is within the positive electrode deterioration range and the negative electrode potential of the battery 10 is within the negative electrode deterioration range. Even if the lower limit voltage is lowered by the offset amount at BOL and the positive electrode potential is within the positive electrode deterioration range or the negative electrode potential is within the negative electrode deterioration range, the positive electrode potential may not be within the positive electrode deterioration range and the negative electrode potential may not be within the negative electrode deterioration range when the lower limit voltage is lowered by the offset amount at EOL. Therefore, the offset amount may be such a value. The larger the offset amount, the larger the available capacity of the battery. Therefore, the offset amount is preferably a value such that, when the lower limit voltage is lowered by the offset amount at BOL, the positive electrode potential of the battery 10 is within the positive electrode deterioration range, and is preferably a value such that, when the lower limit voltage is lowered by the offset amount at BOL, the negative electrode potential is within the negative electrode deterioration range. The threshold TH6 is an example of a first threshold. The threshold TH7 is an example of a second threshold.

The processor 21 may determine the offset amount from the SOH determined in (A) without determining the deviation amount G1. The processor 21 determines the offset amount from the SOH, for example, using a table or function included in the battery database 241. Alternatively, the processor 21 may determine the offset amount from at least one of the positive electrode deterioration amount K1, negative electrode deterioration amount K2, and lithium trap amount TK1 determined in (B) without determining the deviation amount G1. The processor 21 determines the offset amount from at least one of the positive electrode deterioration amount K1, negative electrode deterioration amount K2, and lithium trap amount TK1, for example, using a table or function included in the battery database 241.

In step ST14, the processor 21 sets the voltage obtained by subtracting the offset amount determined in step ST13 from the lower limit voltage at BOL as the lower limit voltage of the battery 10. FIG. 3 shows, as an example of the lower limit voltage set in step ST14, the potential difference V21. The potential difference V21 can be expressed by the following equation (3).

$$V21 = V11 - (\text{offset amount}) \qquad (3)$$

The capacity Q21 indicates the capacity of the battery 10 when the lower limit voltage is V21 at EOL. At EOL, when the lower limit voltage is V21, the capacity Q21, expressed in SOC, is 0%. In other words, the capacity Q21 is the capacity in the fully discharged state at EOL when the lower limit voltage at EOL is V21. The battery capacity F2.1 is the battery capacity of the battery 10 at EOL when the lower limit voltage is V21. F21 is equal to Q23 minus Q21 (F21=Q23−Q21). In FIG. 3, the magnitude relationship between OH and that of Q21 is Q11<Q21, but the present invention is not limited to this.

Figure 4:
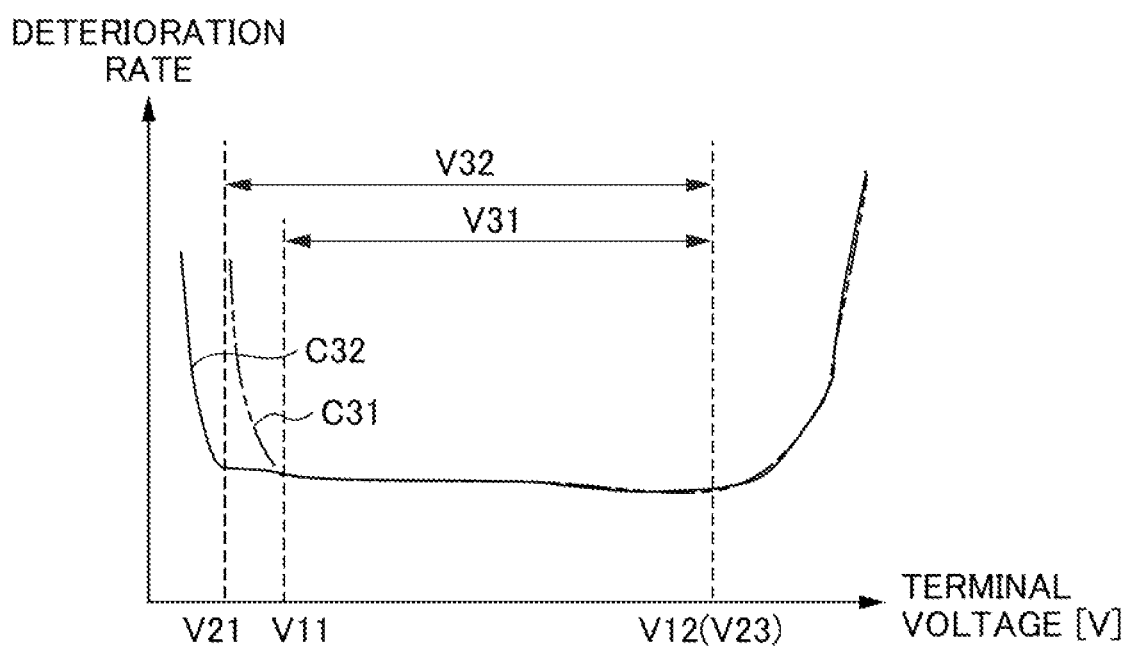
FIG. 4 illustrates a graph showing an example of terminal voltage-deterioration rate characteristics.

The relationship between the terminal voltage and the deterioration rate at each of BOL and EOL is shown in FIG. 4. FIG. 4 is a graph showing an example of terminal voltage-deterioration rate characteristics. Curve C31 is an example of the terminal voltage-deterioration rate curve at BOL. Curve C32 is an example of the terminal voltage-deterioration rate curve at EOL. The voltage V31 represents the difference between the upper limit voltage and the lower limit voltage at BOL, and is expressed as V31=V12−V11. The voltage V32 represents the difference between the upper limit voltage and the lower limit voltage at EOL, and is expressed as V32=V23−V21.

As shown in FIG. 4, the deterioration rate in the low voltage range at EOL is slower than at BOL, Thus, the more the battery 10 deteriorates, the slower the deterioration rate in the low voltage range. Therefore, if the lower limit voltage is set to V21 at BOL, the deterioration rate will be faster. In contrast, the deterioration rate at EOL when the lower limit voltage is V21 is comparable to that at BOL when the lower limit voltage is V11.

The battery control system 1 of the embodiment lowers the lower limit voltage when the battery 10 deteriorates beyond a predetermined level. As a result, the battery control system 1 of the embodiment can increase the battery capacity of the deteriorated battery 10.

The battery control system 1 of the embodiment lowers the lower limit voltage to a value in a range where the positive electrode potential of the battery 10 is not within the positive electrode deterioration range even when the terminal voltage of the battery 10 is at the lower limit voltage. As a result, the battery control system 1 of the embodiment suppresses an increase in the deterioration rate of the battery 10 due to the lowering of the lower limit voltage.

The battery control system 1 of the embodiment lowers the lower limit voltage to a value in a range where the negative electrode potential of the battery 10 is not within the negative electrode deterioration range even when the terminal voltage of the battery 10 is at the lower limit voltage. As a result, the battery control system 1 of the embodiment suppresses an increase in the deterioration rate of the battery 10 due to the lowering of the lower limit voltage.

The battery control system 1 of the embodiment determines the offset amount using the deviation amount G1. As a result, the battery control system 1 of the embodiment improves the accuracy of determining the offset amount and prevents the lower limit voltage of the battery 10 from being lowered excessively.

The above embodiment can be modified as follows. The battery 10 may be a secondary battery other than a lithium-ion secondary battery. For example, it is believed that the battery control system of the embodiment can be implemented in the same way as when a rocking chair type secondary battery is used instead of a lithium-ion secondary battery. The battery control system of the embodiment may include a power storage device other than a secondary battery instead of the battery 10. For example, it is believed that the battery control system of the embodiment can be implemented in the same way when a lithium-ion capacitor is used instead of a secondary battery.

The processor 21 may also change the upper limit voltage of the battery 10. The processor 21 can use known conditions for changing the upper limit voltage. The processor 21 can use a known method for determining the value of the upper limit voltage after the change.

The processor 21 may realize some or all of the processing realized by programs in the above embodiment, by means of a hardware configuration of the circuitry.

The programs that realize the processing of the embodiment are transferred in a state of being stored in an apparatus, for example. However, the apparatus may be transferred without the programs stored therein. The programs may be transferred separately and written to the apparatus. The transfer of the programs at this time can be realized, for example, by recording them on a removable storage medium, or by downloading via the Internet or a network such as local area network (LAN).

The above description of embodiments of the invention is provided as examples and does not limit the scope of the invention. The embodiments of the present invention can be implemented in various modes to the extent that they do not depart from the gist of the invention.

EXPLANATION OF REFERENCE NUMERALS

1 battery control system
10 battery
20 control apparatus
21 processor
22 ROM
23 RAM
24 auxiliary memory
25 bus
30 voltmeter
40 ammeter
50 thermometer
60 timer
241 battery database

What is claimed is:

1. A power storage device control apparatus, comprising a controller that within a range in which a positive electrode potential of the electric storage device is not equal to or lower than a first threshold value, and within a range in which a negative electrode potential of the electric storage device is not equal to or higher than a second threshold value, lowers a lower limit voltage of discharge of the electric storage device based on a deterioration state of the electric storage device.

2. The power storage device control apparatus according to claim 1, wherein the controller lowers the lower limit voltage based on a deviation amount of the negative electrode potential with respect to a capacity of the power storage device due to deterioration of the power storage device.

3. A power storage device control system, comprising:
a power storage device; and
a power storage device control apparatus that within a range in which a positive electrode potential of the electric storage device is not equal to or lower than a first threshold value, and within a range in which a negative electrode potential of the electric storage device is not equal to or higher than a second threshold value, lowers a lower limit voltage of discharge of the electric storage device based on a deterioration state of the electric storage device.

4. A power storage device control method, comprising: within a range in which a positive electrode potential of the electric storage device is not equal to or lower than a first threshold value, and within a range in which a negative electrode potential of the electric storage device is not equal to or higher than a second threshold value, lowering a lower limit voltage of discharge of the electric storage device based on a deterioration state of the electric storage device.

* * * * *